3,749,624
METHOD OF MAKING A BIAS LAID RIBBON
Charles A. Lee and Warren R. Furbeck, Knoxville, Tenn., assignors to International Paper Company, New York, N.Y.
Original application Apr. 9, 1968, Ser. No. 719,986, now Patent No. 3,580,784. Divided and this application Mar. 19, 1971, Ser. No. 126,087
Int. Cl. B31c 3/00
U.S. Cl. 156—195   4 Claims

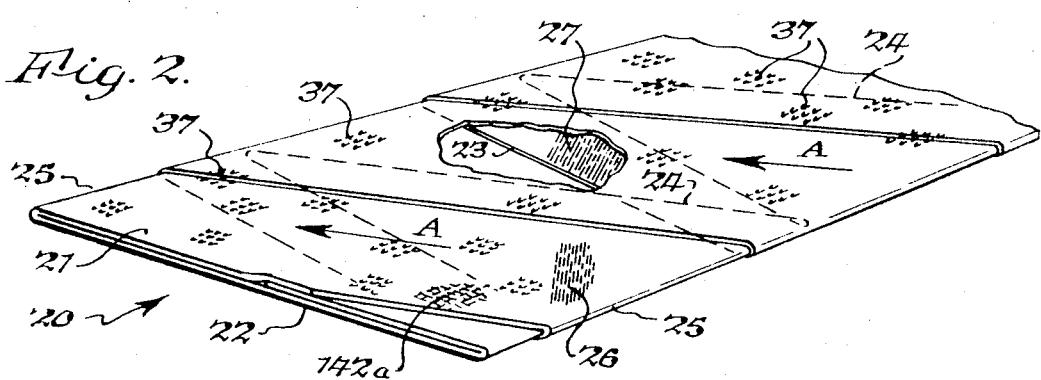
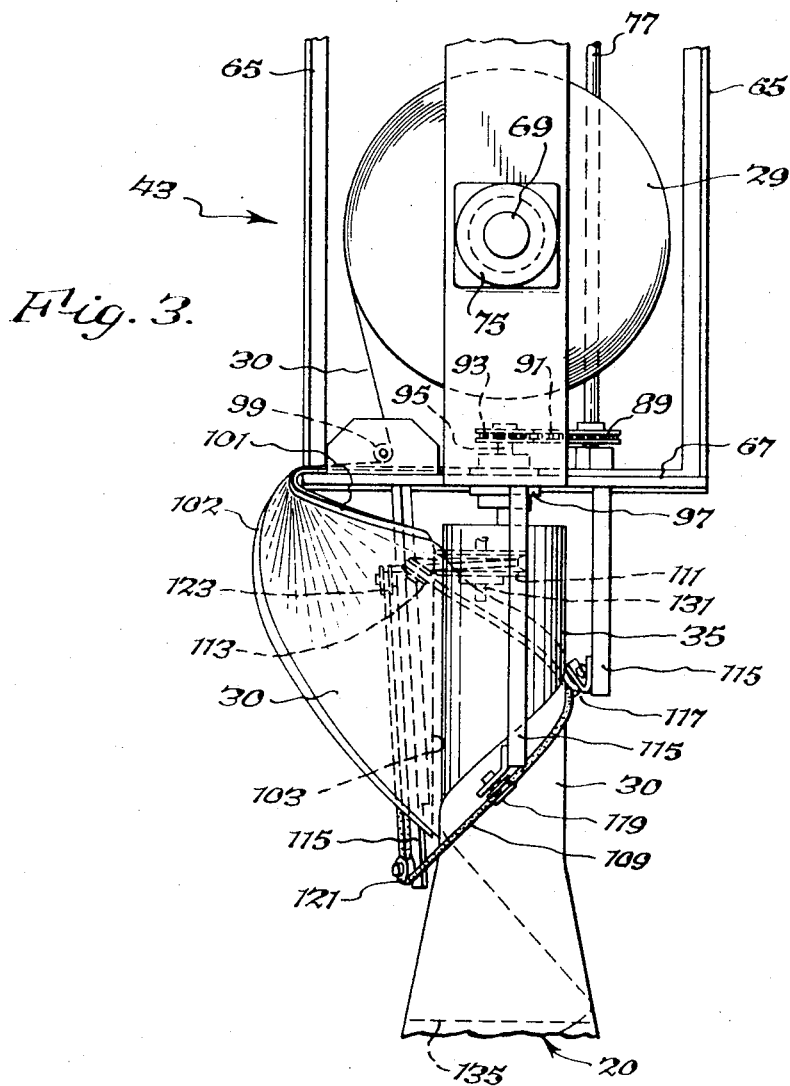

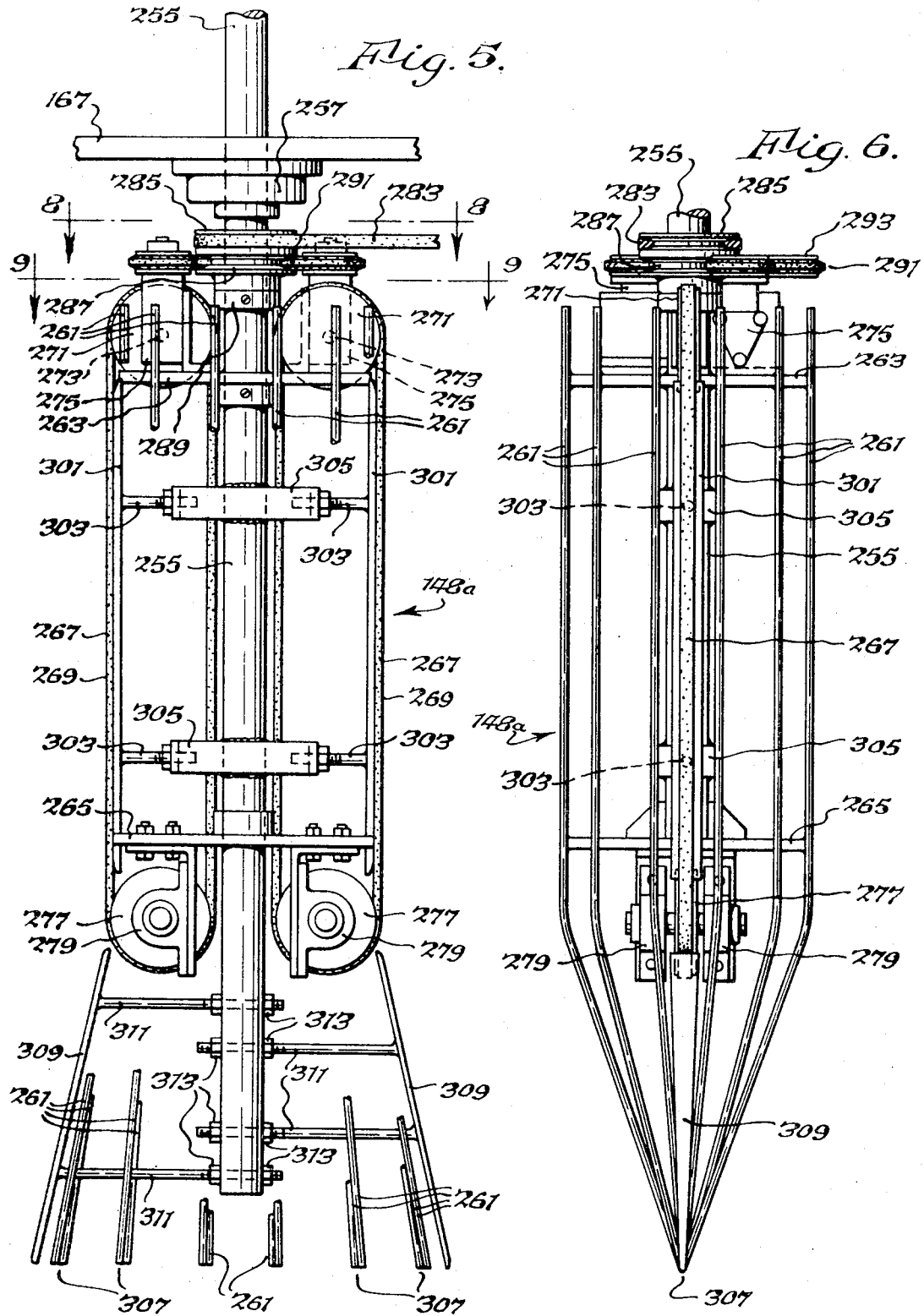

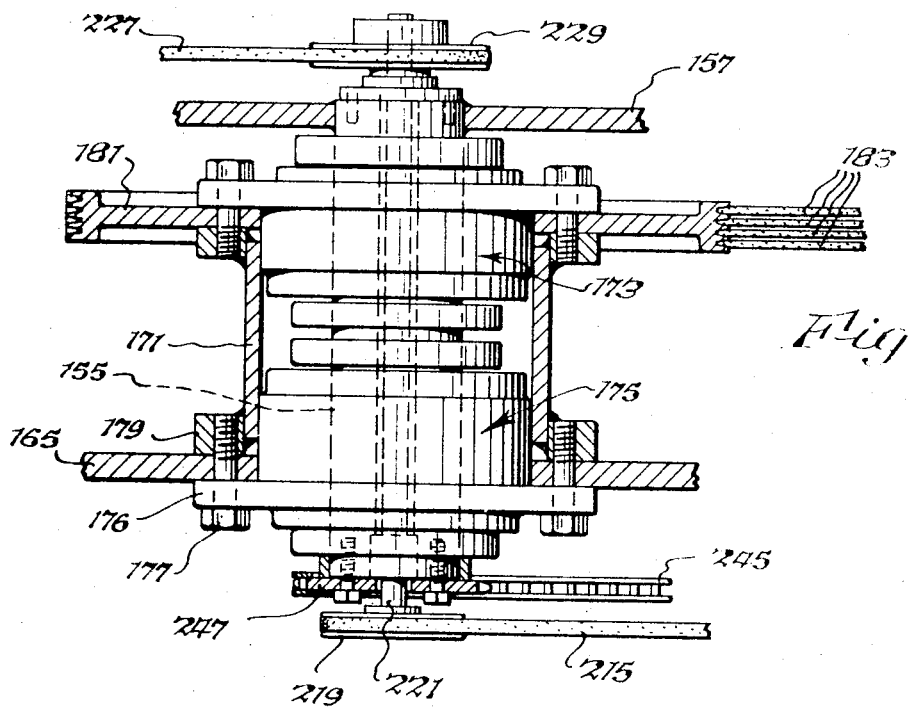

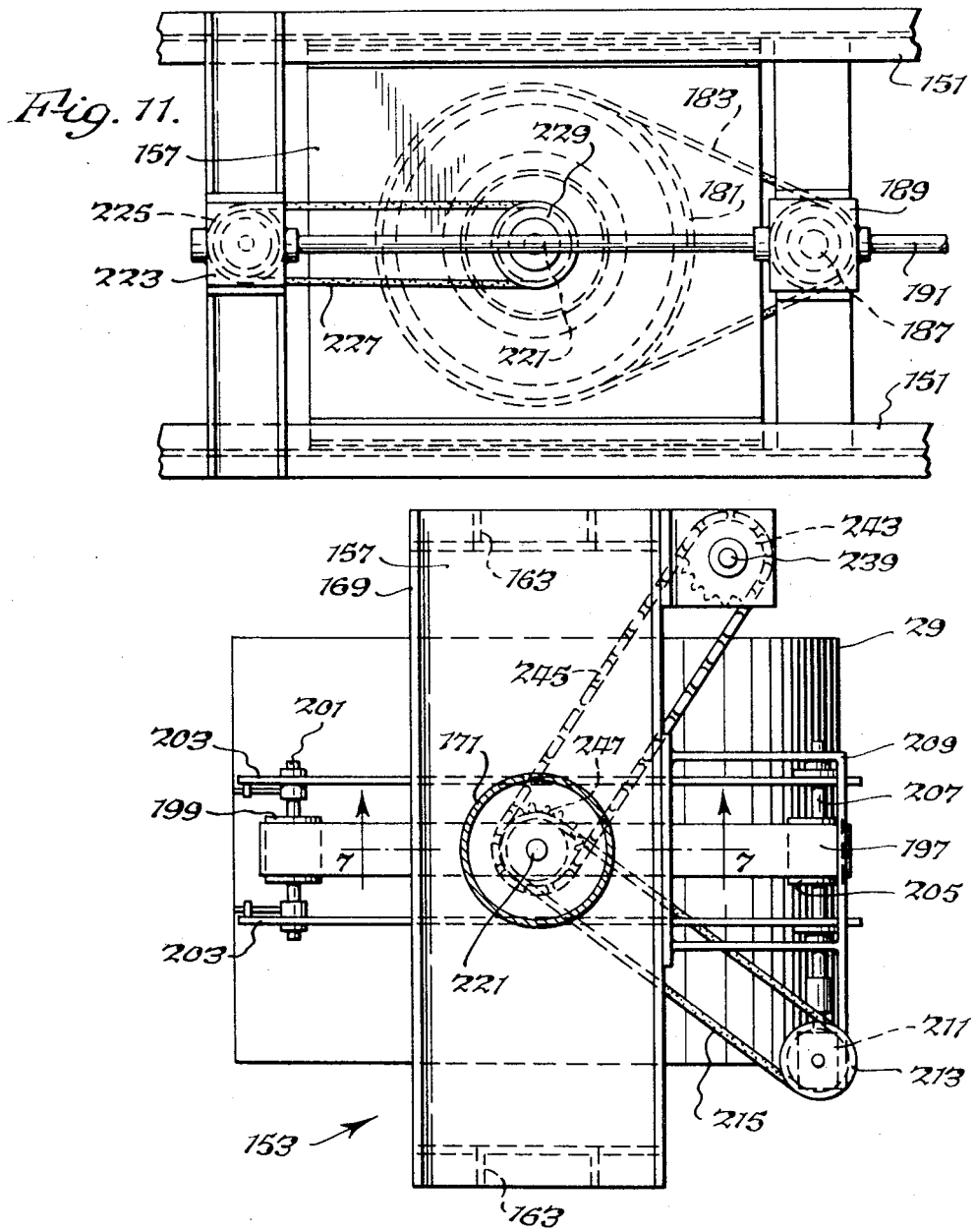

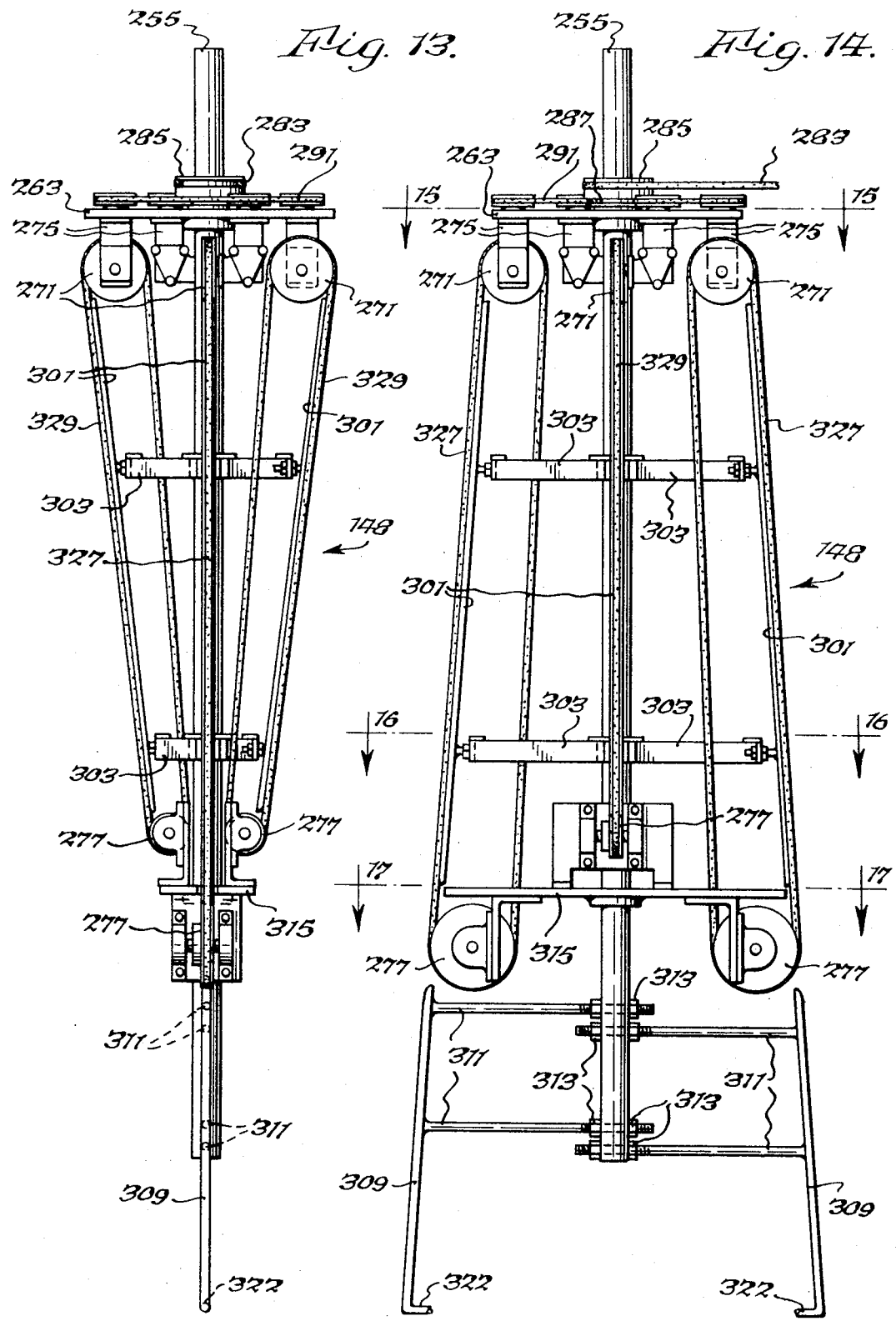

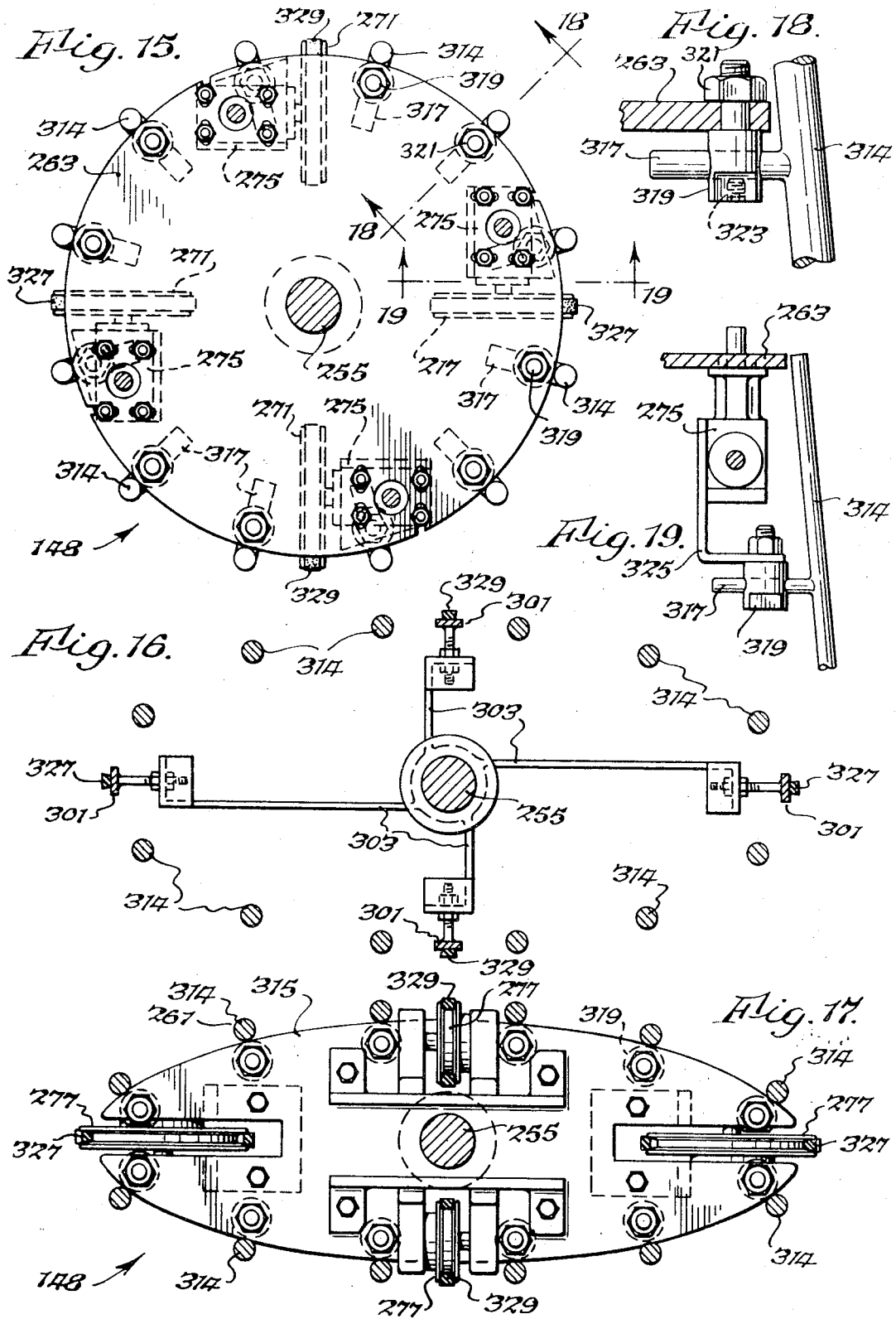

ABSTRACT OF THE DISCLOSURE

A multi-ply ribbon is formed by a method in which at least one web of material is wound spirally about a mandrel and then stripped and flattened. To reduce inertia and gyroscopic forces encountered when unwinding a web parent roll about its longitudinal axis while it is spinning relative the mandrel about another axis, the parent roll is mounted in a rotatable carrier at one end of the mandrel with the respective axes being substantially coplanar. The mandrel may be suspended from the carrier and driven in a direction reverse to that of the carrier so that the mandrel remains stationary relative to nip rolls. The preferred ribbon is formed of bias laid, superimposed plies of creped tissue and has the surfaces of the ribbon textured by spaced depressions at which fibers in one ply are interlocked with fibers in an adjacent ply.

---

This is a division of copending application Ser. No. 719,986 filed Apr. 9, 1968, now U.S. Pat. No. 3,580,784, entitled Apparatus for making a Bias Laid Ribbon.

This invention relates to a method of producing a multi-ply product and more particularly to producing a continuous flat multi-ply ribbon by spirally winding at least one web of material into a hollow tube and then flattening the tube into a continuous ribbon or web.

While the present invention has applicability to forming ribbons comprised of various materials or combinations of materials, it will be described in connection with the manufacture of paper based products. Paper products are enjoying increased success as a substitute for cloth fabrics in a number of fields and product lines such as clothing, disposable diapers, disposable bed sheets and disposable pillow cases. Disposable products must be sufficiently inexpensive that they may be discarded after a short period of use and yet have sufficient strength to permit them to function adequately as a substitute for cloth products. It has been found that products of sufficient strength can be obtained by bias laying webs of paper, such as creped tissue, to form a multi-layered continuous ribbon, which is then formed into the products.

To achieve the objective of low cost products, it is necessary that the product be manufactured at relatively high speeds and in large volumes, much in the manner that paper itself is produced. To achieve such an economical manufacture, the manufacturing equipment should handle large, heavy supply rolls of paper webs and convert the webs at high speeds with a minimum of stoppage for maintenance or equipment repair and without distortion or wrinkling.

The present invention is particularly concerned with the economical manufacture of such bias laid paper products formed from creped tissue webs supplied from parent rolls having a large width, for example, 30, 72 or 144 inches and a diameter up to 48 inches. Surface speeds are as high as 350 feet per minute. Equipment suitable for handling small rolls at low speeds is not practical for high speed rotation of large rolls, as the rolls and heavy supporting equipment generate large inertia and gyroscopic forces during spinning and spirally wrapping the web into a tubular shape. Wide thin webs of creped tissue must be carefully controlled during travel at high speeds if they are to unwind smoothly and uniformly from the supply rolls and be converted into a flattened spiral tube without wrinkling, distorting or tearing. Since creped tissue is relatively limp, it must be carefully supported to avoid long expanses of the creped tissue susceptible to distorting or wrinkling, but the use of large supporting surfaces to prevent wrinkling or distortion results in considerable friction and static electricity being generated during the forming of the spirally wound tube.

A flattened tubular ribbon is not self-sustaining and tends to unwind with a longitudinally directed pull. This makes the ribbon difficult to remove from a forming mandrel and convey to a take-up roll or the like. However, in accordance with the preferred embodiment of the invention, the ribbon plies are interlocked against unwinding by spaced embossments or surface texturing, imparted, for example, by forming a pattern of spaced depressions on the opposite faces of the ribbon. The texturing operation not only adheres fibers of the plies together but also produces a superior cosmetic feel and drape for the product. Preferably, these embossing and texturing operations occur as the ribbon is being formed, thereby eliminating rehandling and other subsequent and costly operations to obtain the desired final form of the ribbon.

Accordingly, a general object of the invention is a method of producing a bias laid ribbon of the foregoing kind on a large commercial scale at a relatively low cost.

Other objects and advantages of the invention will become apparent from the detailed description taken in connection with the accompanying drawings in which:

FIG. 2 is a perspective view of a bias laid product formed according to this invention;

FIG. 3 is a fragmentary, front elevational view of a portion of the apparatus shown in FIG. 1;

FIG. 5 is a side elevational view of a mandrel, with its mandrel rods broken away, for use in the apparatus of FIG. 4;

FIG. 6 is a side elevation of the mandrel of FIG. 5;

FIG. 7 is a vertical, sectional view taken along the line 7—7 of FIG. 12 and showing a main support and drive for the apparatus of FIG. 4;

FIG. 8 is a horizontal sectional view taken along the line 8—8 of FIG. 5;

FIG. 9 is a horizontal sectional view taken along the line 9—9 of FIG. 5;

FIG. 11 is a plan view of the apparatus shown in FIG. 10;

FIG. 12 is a horizontal sectional view taken along the line 12—12 of FIG. 10;

FIG. 13 is a side elevational view of a mandrel, which has some parts removed, for use in the apparatus of FIG. 4;

FIG. 14 is a front elevational view of the apparatus shown in FIG. 13;

FIG. 15 is a horizontal sectional view taken along the line 15—15 of FIG. 14;

FIG. 16 is a horizontal sectional view taken along the line 16—16 of FIG. 14;

FIG. 17 is a horizontal sectional view taken along the line 17—17 of FIG. 14;

FIG. 18 is an enlarged view of a rod mounting clamp for a mandrel taken along the line 18—18 of FIG. 15; and FIG. 19 is an enlarged, cross-sectional view taken along the line 19—19 of FIG. 15 of a mounting bracket for the right angle drive unit.

Figure 1:
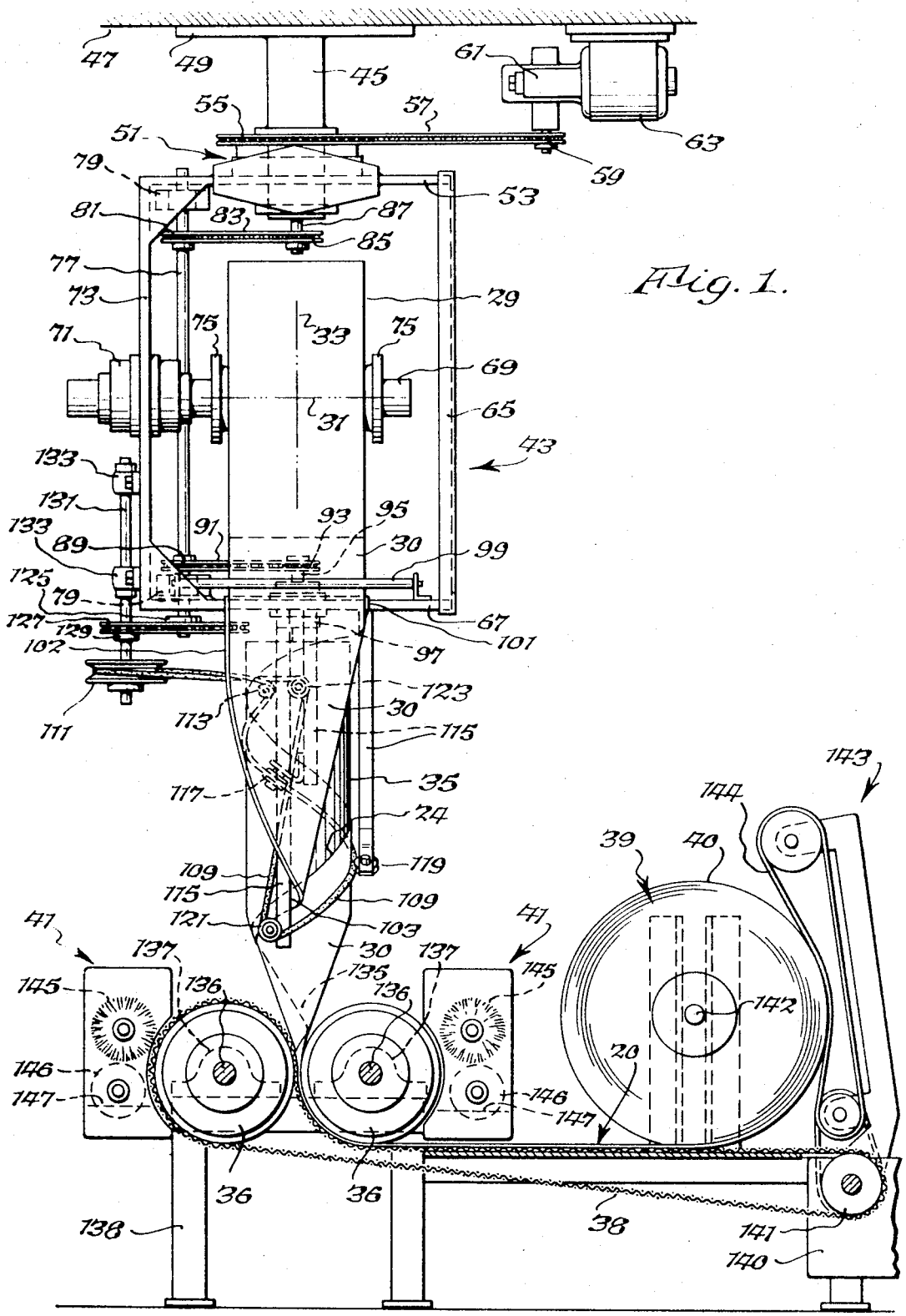
FIG. 1 is a side elevational view of an apparatus for carrying out the invention.

The method of the present invention may be used with various materials such as textile threads, synthetic filaments, yarns, webs of paper, scrim, fabrics or the like, or a combination of these various materials to form a multiply bias laid ribbon. The invention is described in connection with the formation of a two-ply bias laid ribbon 20 (FIG. 2) formed by spirally wrapping a single web of creped tissue into the shape of a tube and then flattening the spirally wound tube into a flattened two-ply ribbon. As best seen in FIG. 2, the bias laid ribbon 20 is formed with an upper ply 21 overlying a lower ply 22.

Creped tissue is an extremely good material for disposable products which will contact the human skin in that creped tissue may be made non-irritating, clean, thin and with good hand and drape qualities. Because of the manner of its formation, the creped tissue has lines of creping running across the longitudinal direction of the web and perpendicular to the sides 23 and 24 (FIG. 4) of the web. Creped tissue, however, has a low tensile strength and little stretchability in the cross machine direction, i.e., across the web. The cross machine directional stretch of the resulting ribbon 20 is improved considerably when the product is made in accordance with this invention, as the lines of creping of the web plies are at an angle, i.e., at a bias, to the longitudinal and transverse dimensions of the flattened ribbon 20. Specifically, the machine directional strengths shown by the directional arrows A of top ply 21 are parallel to the edges 23 and 24 of the web and are at an angle to the longitudinal extending edges 25 of the ribbon. Therefore, lines of creping 26 in the top ribbon ply are disposed at an angle to the longitudinal dimension and, hence, can expand both in the longitudinal and in transverse directions. Similarly, the lines of creping 27 in the bottom ribbon ply are disposed at an equal but opposite angle to the longitudinal ribbon dimension and hence can also expand in the longitudinal and transverse directions.

To provide high rates of production, the multiply bias laid ribbon is desired to be formed from relatively large, heavy supply rolls 29 (FIG. 1) of creped tissue from which a web 30 will be continuously stripped at relatively high rates of speed and converted into the resultant bias laid ribbon. For example, it is most desirable that the apparatus be capable of using rolls having a width of 18, 30, 72 inches or larger and having diameters 4 feet or larger. It will be appreciated that to spin such rolls will require considerable amount of force and that such heavy rolls and equipment can generate considerable inertia forces which must be overcome when starting or stopping the machine. Also, gyroscopic forces are involved because, as the roll turns and unwinds about a longitudinal axis 31 through its core, it is being spun about an axis 33 of a mandrel 35.

According to an important aspect of the present invention, the inertia and gyroscopic forces generated when forming the ribbon are reduced by disposing the parent roll 29 at the end of the mandrel 35 with their respective axes 31 and 33 being substantially coplanar. In the illustrated embodiment of the invention, these axes are intersecting and the parent roll 29 is centered on the longitudinal axis 33 of the mandrel 35 so that the center of gravity of the roll is on the mandrel axis and its inertia is reduced to the minimum value. Preferably, the longitudinal spin axis 33 is disposed vertically so that the gravitational forces are offset and aid the web in moving down from the parent roll.

The complexities of forming a relatively wide ribbon 20 of bias laid creped tissue without wrinkling or tearing it are considerable because of the limited tensile strength of creped tissue, the high speeds of web travel and the relatively wide expanses of the web. As will be explained, the web travel speed is carefully controlled and the web is guided throughout its travel by supporting surfaces which reduce the friction to a minimum and which are shaped so as to guide all portions of the web for travel through the same distances and at the same linear speed. If one portion of the web travels at a different linear speed than another portion of the web, the web will wrinkle and may even tear.

As an aid to understanding the invention, the method of forming the bias laid ribbon will be first described generally.

The steps are as follows: Unwinding the web of creped tissue from the supply or parent roll 29; wrapping the web 30 into a hollow tubular form about the mandrel 35; stripping the formed tube from the mandrel while guiding it into a wide multi-ply ribbon; and flattening the ribbon 20, such as by nip rolls 36, and compressing the fibers of the respective plies 21 and 22 at spaced locations, such as by a meshed belt carrier 38, into frictional engagement with one another to interlock the plies. Preferably, as will be described more fully below, the plies are further interlocked by embossing the plies together at spaced embossment areas 37 (FIG. 2) which hold the plies firmly together to prevent their separation and unwinding under a longitudinally directed pull from a winder 39 (FIG. 1) which winds the ribbon 20 into a roll 40. In the preferred method, the fibers of the web are conditioned by moisteners 41 to reduce the static electricity being generated and to provide a better texturing of the web surface during the fiber compression step.

An apparatus for practicing this method will be generally described in connection with the apparatus shown in FIGS. 1 and 3, and another apparatus will be specifically described in connection with an apparatus shown in FIGS. 4–19, this latter apparatus being the preferred.

To keep the forces involved and the travel speeds reduced to minimum values, the longitudinal axis 33 of the mandrel 35 is disposed vertically and the parent roll 29 is disposed above the mandrel with its axis 31 perpendicular to the axis 33 which extends vertically to bisect the parent roll 29. The parent roll is supported for rotation in a rotatable carrier 43 journaled for rotation on an overhead supporting column 45. The supporting column 45 is fixed to an overhead supporting beam 47 by means of a laterally extending flange 49. The column 45 is preferably of heavy construction as it must support the weight of the parent roll 29, carrier 43 and mandrel 35, as will be explained in detail.

To journal the carrier 43 for rotation about the axis of the mandrel 35, the lower end of the column is provided with a bearing 51 which has an inner race fixed to the column and outer race fixed to a top plate 53 of the carrier 43. For the purpose of rotating the carrier, the outer race of the bearing 51 carries a sprocket 55 about which is trained a driving chain 57 extending horizontally to a smaller size sprocket 59 on the output end of a drive shaft of a gear reducer 61 coupled to and driven by a driving motor 63. As the motor 63 rotates and drives the driving chain 57, the sprocket 55 fixed to the carrier 43 turns and rotates the carrier 43 about the vertical axis 33 extending through the column 45, parent roll 29 and mandrel 35.

The carrier 43 is in the form of a generally open boxlike frame having a plurality of vertically extending angle irons 65 fastened between the upper plate 53 and a lower plate 67. The open framework permits the sliding of the parent roll 29 onto the free end of a rotatable spindle 69 which is in the form of a cylindrical shaft extending as a cantilever from and journaled in a bearing 71 supported on a vertically disposed plate 73 (FIG. 3) in the carrier 43. A pair of conventional tapered core holders 75 are disposed on the spindle 69 to center the roll core on the spindle 69, and they can be quickly removed to release the roll 29 for removal.

It is preferred to support the mandrel 35 directly from the rotating carrier 43, but unlike the carrier it is desired that the mandrel remain stationary particularly since its lower end is inserted into the space between the counter-rotating nip rolls 36. To assure that the mandrel 35 remains stationary and does not rotate with the carrier 43, the mandrel is driven in a reverse direction at an angular speed which is identical to the speed of carrier rotation. To couple the mandrel and carrier particularly for rotating at the same speeds during a start up or a slow down of web travel, the mandrel is driven directly from and as a result of the carrier rotation.

To this end, the carrier 43 is provided with a vertically disposed, mandrel drive shaft 77 which is journaled in upper and lower bearings 79 fastened to the respective top and bottom plates of the carrier. At its upper end, the mandrel drive shaft carries a sprocket 81 which receives a chain 83 extending horizontally across the top of the parent roll 29 to a gear or sprocket 85 fixed to a vertically extending stationary shaft 87 fixed to the lower end of the column 45. Movement of the chain 83, therefore, results from the carrier 43 orbiting the shaft 77 about the vertical axis 33. Because it is the rotation of the carrier which causes turning of the mandrel drive shaft 77, it will be seen that the latter rotates at a speed directly proportional to the speed of the carrier and that, if the carrier stops or slows down, then the drive shaft 77 correspondingly slows down or stops its rotation.

To drive the mandrel 35, the lower end of the drive shaft 77 carries a sprocket 89 which drives a horizontally extending chain 91 which is trained about a sprocket 93 on the upper end of a mandrel driving and supporting shaft 95. This latter shaft is journaled in a bearing 97 fixed to the bottom plate 67 of the carrier. In summary, the carrier 43 rotates and orbits the mandrel drive shaft 77 about the axis 33 and the chain 83 causes the mandrel drive shaft to rotate and drive the lower chain 91 to rotate the mandrel support shaft 95 and mandrel 35 in an opposite direction and at the same angular speed as the carrier rotates. Therefore, the mandrel 35 remains stationary relative to the nip rollers 36.

In this embodiment of the invention, the mandrel 35 is formed from a hollow, cylindrical tube of sheet metal of right circular cross section at its upper end. The mandrel supporting shaft 95 is attached to circular plates within the mandrel and locates the outer surface of the mandrel so as to be disposed substantially vertically. The web leaving the parent roll 29 and the carrier 43 is disposed generally horizontally as best seen in FIG. 3, but when the web engages the mandrel, it not only is disposed in a substantially vertical plane but its machine direction is also at a predetermined inclination to the horizontal. As will be explained, the angle of inclination at which the creped tissue web engages the mandrel 35 determines the helix angle of the spirally wound tube on the mandrel.

The web leaves the parent roll 29 and travels beneath a small guide roller 99 (FIGS. 1 and 3) journaled in brackets with its longitudinal axis disposed generally horizontal and spaced slightly above the bottom plate 67 of the carrier. From the roller 99, the web extends to the upper edge of a convolute shaped chute or guide 101 which, in the present instance, is a sheet metal plate formed with its upper end 102 (FIG. 1) substantially in a horizontal plane and with its lower end 103 (FIG. 3) disposed substantially in a vertical plane closely adjacent the cylindrical surface of the mandrel 35. The convolute shape is formed so that all parts (FIG. 3) of the web travel at the same surface speed and through the same distance, thereby preventing any wrinkles or tearing of the web due to different surface speeds at the respective web edges.

For the purpose of stripping the formed tube from the upper portion of the mandrel 35, it is preferred to provide a stripper belt 109 which is brought into engagement with the tubular shaped web and which travels downwardly at the same speed as the web. Consequently, the stripper belt does not wrinkle or distort the creped tissue by sliding relative to it during the stripping operation. The stripper belt assists the nip rolls 36 which are also providing a pulling force to strip the formed tube from the mandrel 35. The endless stripper belt has one run extending from a drive sheave 111 (FIG. 1) generally horizontal to a first guide roller 113 which is supported on one of several vertical brackets 115 fixed at their upper ends to the bottom carrier plate 67. From the guide roller 113, the stripper belt 109 moves into engagement with the creped tissue at the upper end of the mandrel. The belt then travels about the mandrel in a substantially helical path which is generally parallel to the upper edge 24 of the creped tissue web. Guide rollers 117 and 119 press the stripper belt 109 against the creped tissue 30 and the latter against the mandrel 35. As the creped tissue tube begins to flare at the bottom of the mandrel, the stripper belt 109 leaves the creped tissue and moves about the lowest support and guide roller 121 and returns upwardly to a guide roller 123 (FIG. 1) from which the belt moves horizontally to the sheave 111. In this manner, the stripper belt 109 continuously moves through a path having a run in which it engages and strips the tube downwardly of the surface of the mandrel.

To drive the stripper belt 109 at a speed identical to the creped tissue travel speed, particularly as its speed varies at the start up or stopping of the apparatus, the stripper belt 109 is driven directly from the lower end of the mandrel drive shaft 77 which is provided with an additional sprocket 125 (FIG. 1) for driving a chain 127 extending horizontally to a sprocket 129 fixed on a vertically extending drive shaft 131 extending upwardly to and rotating in bearings 133 fastened to the carrier side plate 73.

As previously stated, the upper portion of the mandrel 35 is circular in cross section and its lower portion gradually tapers to a flattened lower end 135 which extends closely adjacent to the nip of the counter-rotating rolls 36. The lower end 135 of the mandrel is substantially in the form achieved by flattening a vertical cylinder at its lower edge and gradually tapering the side walls from the lower edge to a circular cross section. This tapered mandrel surface supports the tube during its transition from a cylindrical tube to a flat ribbon and prevents wrinkling of the creped tissue.

To flatten the creped tissue tube into a ribbon without distortion, wrinkling or tearing, the tube remains on the mandrel until closely adjacent the nip of rolls 36 which are mounted on horizontally disposed shafts 136 journaled in bearing mounts 137 carried by an upstanding frame 133. Since the tube is to be flattened without tears, distortions or wrinkles, the counter-rotating nip rolls 36 are driven by a motor (not shown) to have their peripheral surface speeds correlated with the web and ribbon travel speed.

In accordance with another aspect of the invention, the problems of transporting the flattened ribbon from the nip rolls 36 and interlocking the ribbon plies are solved by a unique arrangement of the belt carrier 38 moving through the nip of the rolls. If the plies were merely dropped onto a conveyor belt from the nip rolls, they would pile up and not move off directly with the conveyor as they do when they are locked to the belt moving through the nip. The carrier is found to prevent unwinding or unraveling of the ribbon plies, which will occur if the carrier is not employed and the winder 39 pulls the ribbon directly from the nip rolls. Thus, the carrier 38 interlocks the fibers and transports the ribbon without unwinding from the nip rolls. The belt carrier 38 is slightly wider than the ribbon and extends beneath the nip rolls 36 and across generally horizontally to support and carry the ribbon. Thus, the ribbon is transported off at a right angle to the winder 39. The carrier prevents unwinding of the ribbon 20 with a longitudinally directed pull from the winder 39 as it is driven by a drive unit 140 to travel at the speed of ribbon travel. The drive unit 140 includes a motor for driving a small pulley 141 about which is trained the endless meshed belt carrier 38.

An improved product is obtained by compressing the fibers of the creped tissue plies 21 and 22 at spaced areas by means such as the mesh belt carrier 38 moving through the nip of the rolls 36. In this instance, the carrier belt is trained about one of the nip rolls 36 and has an upper run moving through the nip. Preferably, the belt is formed of woven wire with knuckles formed by crossing wires. The nip rolls 36 are provided with a hard rubber outer surface layer and are mounted so that their surfaces at the nip compress the creped tissue into interstices in the mesh belt and against the knuckles and wires, the latter compressing the fibers together to form indentations taking the pattern of the wires and knuckles. The resulting pattern is a series of spaced indentations 142a, as formed by the knuckles and wires compressing the fibers of opposing plies 21 and 22 together, which interlock the fibers of the plies with one another. The bias laid product is more absorbent, has a wider surface area, and has a textured surface as a result of the spaced indentations 142a and working of the fibers by the belt.

Although the fibers are interlocked, the plies may separate and unwind with a strong longitudinally directed pull, as from the winder 39. In this instance, the winder 39 is rotatably mounted on a shaft 142 and includes driving means which may comprise a tangential drive 143 driven to wind the bias laid ribbon into the roll 40. The drive 143 may include a belt 144 driven by the drive unit 140 for the carrier 38 to drive the winder 39 at the same tangential speed as the web travels on the mandrel 35 so that the bias laid ribbon is wound without tearing, wrinkling or unwinding. The drive 143 may be biased, as by springs, to hold the belt 144 against the surface of the roll 40 so that the surface moves at the speed of the belt 38.

It is preferred to condition the creped tissue fibers by the pair of moistener units 41 each of which sprays moisture on a respective nip roll 36 which in turn applies the moisture to a surface of the flattened ribbon. The addition of moisture has been found to be extremely beneficial in reducing the static electrical charges being generated by friction as the web travels across the supporting surfaces of the mandrel. The preferred manner of moistening the web is by placing a brush roll 145 in engagement with the top surface of a dip roll 146 which rotates in a bath 147 of water and carries water to the brush roll which flicks the water from the top of the dip roll onto the surface of the belt 38 and the nip roll 36. The dip rolls have their lower portions immersed in the water and are driven at a speed to provide a film of water of predetermined thickness on their surfaces. The brush rolls generates a fine, uniform spray so that the web is uniformly moistened to a predetermined moisture content, for example, about 10%. The addition of the moisture aids in the interlocking of the fibers by the belt carrier 38.

Figure 4:
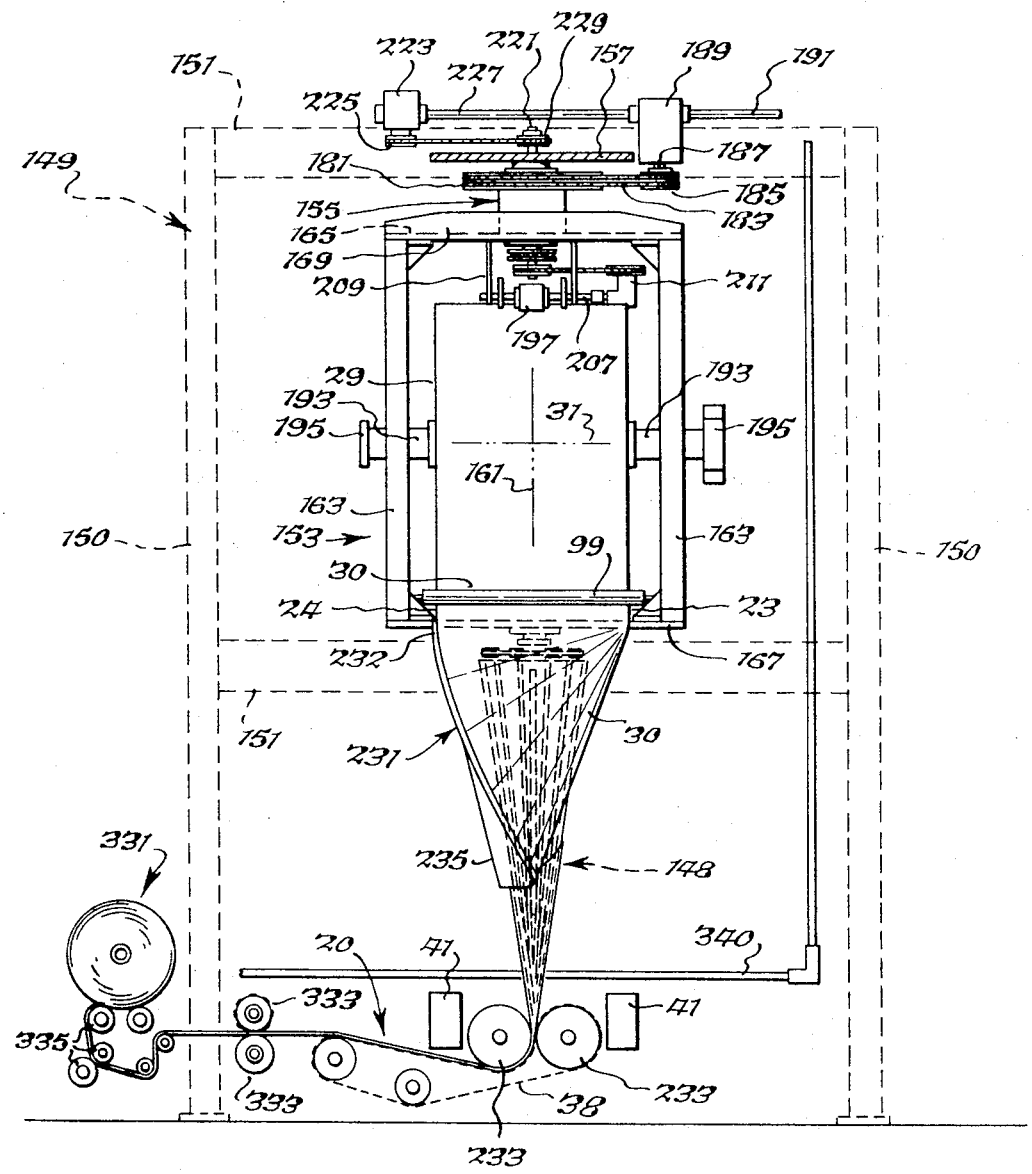
FIG. 4 is a schematic illustration of another embodiment of the invention.

The preferred embodiment of the invention, which will now be described in connection with FIGS. 4–19, is particularly adapted to large diameters and widths of webs and for operating at higher web travel speeds than the apparatus of FIGS. 1 and 2. As will be understood, when unwinding large diameter parent rolls, there is a considerable difference in the length of web unwound during a single revolution of roll at the beginning of a full roll than at the end of a nearly spent roll due to reduction in diameter and circumference of the roll. As will be explained, a surface drive is provided to keep the web travel speed substantially constant even though the diameter of the parent roll is being reduced with unwinding. With larger width webs, it is more difficult to hold and guide the wide expanses of web. Furthermore, the amount of friction and static electricity being generated is increased. As will be explained in greater detail, the web wraps more easily without wrinkling and friction is reduced by providing a substantially conically shaped, bird cage mandrel 148 (FIG. 4). The mandrel 148 is termed a bird cage in that it is formed with a plurality of long, angularly spaced bars.

Proceeding now with the detailed description of the preferred embodiment of the invention, there is provided a supporting structure or frame 149 (FIG. 4) which may take many shapes, and in this instance includes a plurality of upstanding support columns 150 interconnected by cross beams 151 to form a box-like framework. In the present instance, a rotatable carrier 153 and the mandrel 148 are disposed and aligned vertically to reduce gyroscopic forces and to obtain an assist from gravity in moving the sheet material onto and from the mandrel. Both the mandrel 148 and carrier 153 are supported by a depending, stationary support shaft 155 fastened to an overhead plate 157 (FIG. 4) which is centrally located between a pair of overhead cross beams 151 disposed within the framework. As stated above, the mandrel 148 and the carrier 153 are aligned on the vertical axis 161 which is also the longitudinal axis for the support shaft 155.

In the preferred embodiment, the rotatable carrier 153 is in the form of a generally open framework formed by widely spaced, vertical frame members 163 (FIG. 4) which are fixed at their upper ends to a horizontally disposed top plate 165. The frame members 163 extend down to and are fixed at their lower ends to a horizontally disposed bottom plate 167. The top support plate is stiffened by a pair of overhead, spaced vertical plates 169 fastened to the top plate. Also, fastened to the upper side of the top plate is a cylindrical sleeve 171 (FIG. 7) having its longitudinal axis coincident with the axis of rotation 161 for the carrier 153 and the longitudinal axis of the supporting shaft 155.

In the preferred embodiment of the invention, the rotatable carrier 153 is journaled for rotation about the vertical support shaft 155 by bearing means including an upper bearing 173 and a lower bearing 175 (FIG. 7). These bearings have their inner races fixed to the exterior of the stationary shaft 155 and have outer races fastened to the interior wall of the sleeve 171 (FIG. 7). The upper end of bearing 173 extends upwardly adjacent to the frame plate 157 and its lower end is disposed within the sleeve 171. The lower bearing 175 is disposed within the sleeve 171 and its lower end abuts bearing mounting plate 176 (FIG. 7) which is fastened by bolts 177 threaded into a radially extending flange 179 welded to the outer, lower end of the sleeve 171. The mounting plate 176 extends beneath the top plate 165 of the carrier 153 to assist in supporting the carrier 153 on the sleeve 171.

For the purpose of rotating the carrier 153, a sheave 181 (FIG. 7) is bolted to the upper end of the sleeve 171 and is provided with a plurality of circumferentially extending grooves for receiving four driving belts 183 which extend horizontally to a sheave 185 (FIG. 4) carried on a rotatable, vertically disposed shaft 187 depending from a right angle drive unit 189 which, in turn, is driven by an overhead line shaft 191. The line shaft rotates the sheave 185 to turn the belts 183 and rotate the sheave 181 so that the carrier 153 turns at speeds up to 50 r.p.m. in this embodiment of the invention.

As previously explained, the inertia of the carrier 153 and the torque required to rotate the carrier is reduced by centering the spinning axis of the carrier 153 and parent roll 29 on the longitudinal axis of the mandrel 148 about which the web will be wrapped. Specifically, the parent roll is mounted on opposite ends of horizontally disposed, stub shafts 193 (FIG. 4) which center the roll over the longitudinal, vertical axis 161. It is preferred to provide a conventional quick connect and disconnect mechanism for changing parent rolls with rotation of hand wheels 195 to project the stub shafts 193 into the core or to retract the stub shafts to release the core for removal of the spent parent roll. The open sides of the carrier 153 facilitate insertion of a parent roll into the carrier interior and alignment of the core for reception of the stub shafts 193.

Figure 10:
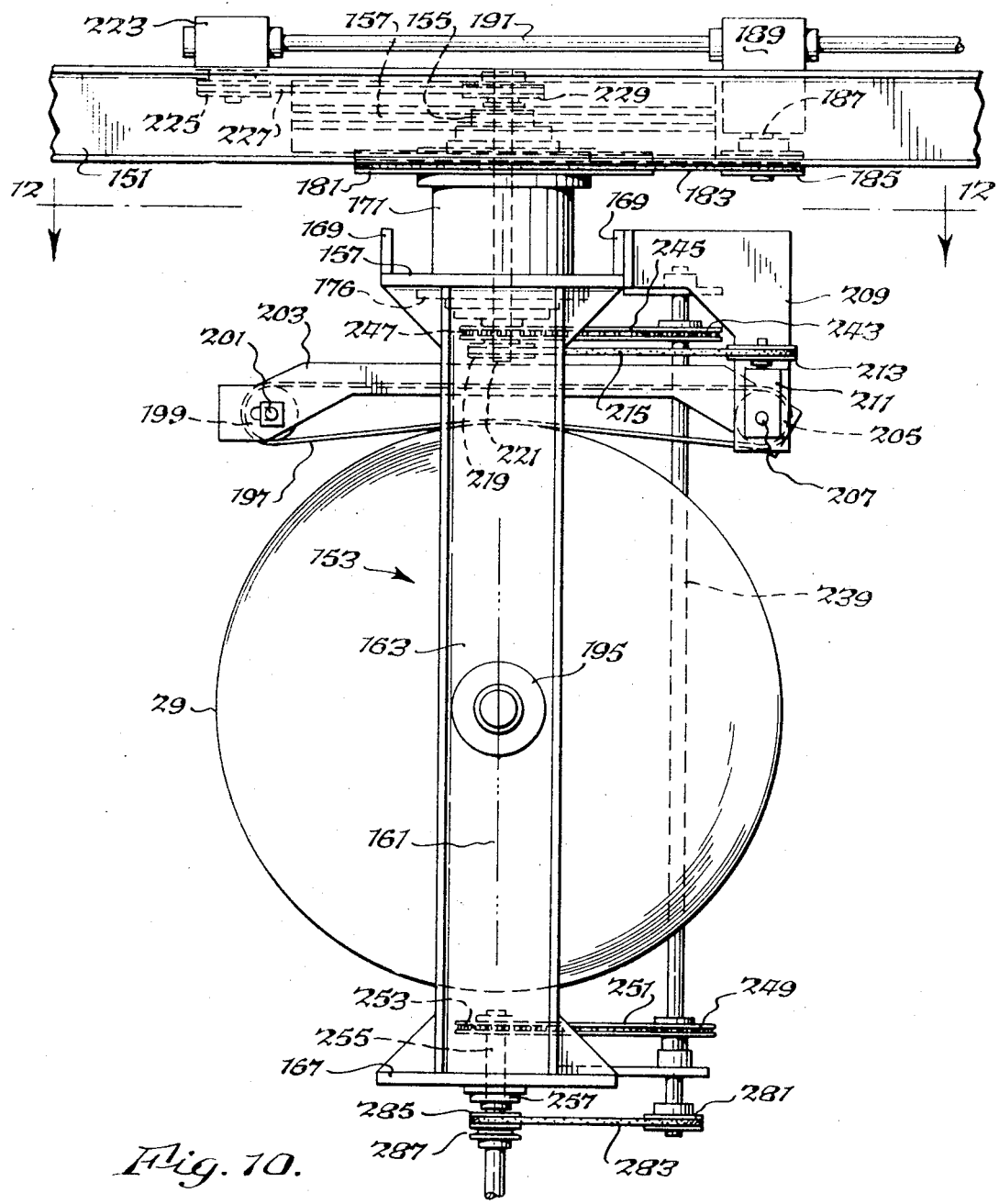
FIG. 10 is a fragmentary, side elevational view of the top part of the apparatus of FIG. 4.

For efficient operation, the web travels at a constant linear speed and therefore the various mechanisms operating on the web also may operate at a constant linear speed even though the diameter of the parent roll decreases and the linear feet of web being unwound with each revolution of the roll is decreasing. In the preferred embodiment, means are provided to compensate for reduction in roll diameter to obtain a substantially uniform speed web travel, for example, 350 feet per minute. The drive means includes an endless driving belt 197 (FIG. 10) having a lower run frictionally engaging the top circumferential surface of the parent roll 29. The driving belt is trained about and supported on an idler roller 199 carried on a shaft 201 spanning outer free ends of support arms 203 (FIGS. 10 and 12). The belt is also trained about a driving roller 205 fixedly mounted on a shaft 207 supported by vertical bracket arms 209 (FIG. 10), which are fixed at their upper ends to the carrier top plate 157 and its stiffening plates 169. The belt support arms 203 extend outwardly from the pivot shaft 207 over the parent roll and are free to pivot downwardly about the pivot shaft 207 during unwinding of the parent roll. The arms pivot down to maintain the belt 197 in continual frictional engagement with the upper surface of the parent roll.

To drive the belt 197 at a constant linear speed to compensate for the diminishing roll diameter, one end of the belt driving shaft 207 is coupled to a right angled gear unit 211 (FIGS. 10 and 12) to which is fixed an upper driving sheave 213. The latter is driven by a belt 215 trained about a drive sheave 219 fixed at the lower end of a small diameter shaft 221 (FIGS. 7 and 10), which extends upwardly through a bore in the support shaft 155 to above the upper top frame plate 157. As best seen in FIG. 10, a variable speed drive unit 223 is supported on the stationary beam 151 and is connected by a sheave 225 and a belt 227 to drive a sheave 229 fixed to the upper end of the vertical drive shaft 221. On its input side, the variable speed drive unit 223 is connected to the line shaft 191. Its speed is adjusted to drive the parent roll 29 tangentially at the constant tangential speed required.

As the web issues from the bottom of the parent roll 29 (FIG. 4), it is traveling in a generally horizontal plane at a relatively high speed and it must be reoriented to a substantially vertical plane as it wraps about the outer surface of the mandrel 148. To prevent distortion, wrinkling and tearing of the web 30, particularly where the web is relatively thin creped tissue, the latter is guided through this change of planes by a guide means in the form of a chute 231 which has a convolute surface extending from an upper edge 232 disposed horizontally and adjacent the bottom of the parent roll to vertically disposed edge 235 adjacent the cylindrical surface of the mandrel 148. The chute 231 is fastened to the carrier by suitable brackets which are not shown. In its preferred form, the chute 231 is slightly wider than the web and is curved such that all points defining a transverse line on the web, i.e., a line drawn across the web and perpendicular to web edges 23 and 24 travel the same distance and at the same speed as the web changes directions. The discharge end of the chute rotates about and is disposed as close as is possible to the cylindrical surface of the mandrel. By guiding the web in this manner, thin, non-self-sustaining webs may be moved at high speeds from the roll 29 to the mandrel 148 in a uniform manner.

Not only does the chute 231 reorient the web 30 from a horizontal to a vertical orientation, but it also determines the angle of inclination of the web to the horizontal. That is, the web 30 is wrapped in a helix about the mandrel and the chute determines the helix angle. Usually the angle of inclination, or helix angle, ranges between 15–45 degrees, although this angle may be varied from this range. For angle changes of only several degrees, the chute 231 is merely shifted, but for larger variations in angles, the shape of the convolute surface is changed to bring the web to the mandrel at the desired angle.

In the preferred embodiment of the invention, the mandrel 148 is supported directly from the rotating carrier 153, but unlike the carrier, it is desired that the mandrel remain stationary, particularly since its lower flared end is disposed within the space between a pair of counter rotating nip rollers 233. To assure that the mandrel remains stationary and does not rotate with the carrier, the mandrel is driven in the reverse direction at an identical angular speed to the rotation of the carrier. For example, if the carrier 153 is rotated at 50 r.p.m. in the counterclockwise direction, the mandrel 148 is driven in the clockwise direction at 50 r.p.m.

To couple mandrel speed to carrier speed, particularly during the start up and slow down of the carrier 153, the mandrel 148 is driven directly from and as a result of the carrier rotation. To this end, the carrier is provided with a mandrel drive shaft 239 (FIG. 10) which turns with the carrier. More specifically, the drive shaft 239 is mounted vertically by upper and lower brackets fastened to upper and lower plates and with its axis offset from the rotational axis 161 of the carrier. Fixed to the upper end of the mandrel drive shaft is a sprocket 243 about which is trained a chain 245 having its opposite end trained about a stationary gear 247 (FIGS. 7 and 10) fixed by bolts to the lower end of the stationary support shaft 155. The gear 247 is stationary, therefore, the chain 245 turns the sprocket 243 with orbital movement of the shaft 239 during the rotation of the carrier 153. Thus, it will be seen that the shaft 239 rotates at a speed in proportion to the speed of orbital movement of the carrier 153.

To drive the mandrel 148, the lower end of the orbital shaft 239 carries a sprocket 249 (FIG. 10) for driving a chain 251 which is also trained about a sprocket 253 fixed to a mandrel driving and support shaft 255. The latter is journaled for rotation in a bearing 257 (FIG. 10) fixed to the underside of the bottom carrier plate 167. It will be understood that the axis of the mandrel shaft 255 is aligned with the vertical axis 161. In summary, as the carrier rotates and orbits the shaft 139 about the axis 161, the fixed gear 247 and chain 245 cause the shaft 239 to rotate as it orbits. The shaft 239 drives the chain 251 to rotate the mandrel support shaft 255 and thereby the mandrel 148.

With relatively high speeds of web travel, considerable difficulty is encountered in maintaining a uniform flat, unwrinkled and undistorted surface across the web as it is wrapped in a spiral manner on the mandrel, formed into a generally flattened, tubular shape, and then compressed into a flat multi-ply ribbon. To obtain more uniform web travel, the frictional force between the mandrel and the web is reduced in the preferred form of the invention by forming the mandrel like a cage defined by a plurality of longitudinal extending elements such as bars or rods (FIGS. 5, 6 and 9). Two forms of cage mandrels are shown, the first to be described in connection with FIGS. 5, 6 and 9, has an upper portion in the form of a right circular cylinder while the second form has an elliptical cross section (FIGS. 16 and 17) throughout a major portion thereof. Herein, the predominantly right circular cylinder mandrel is referred to by the reference character 148a to distinguish it from the elliptical cross sectioned mandrel 148. The mandrel 148a is formed with twelve elongated rods 261 of circular cross section fixed at their upper ends to and angularly spaced about an upper circular plate 263 (FIG. 9) fixed to the mandrel support shaft 255. In a like manner, the rods 261 are fastened as by welding to a lower, circular plate 265 (FIG. 6) which is also fastened to the mandrel shaft 255. The rods extend longitudinally and parallel to the longitudinal axis 161 through the mandrel shaft 155 between the plates 263 and 275.

For the purposes of assisting the nip rolls 233 in stripping the tube from the mandrel 148a, it is preferred to provide a pair of feed or stripper belts 267 (FIGS. 5 and 6) which engage the inner surface of the spirally wrapped tube while it is on the mandrel 148a. The stripper belts 267 engage a relatively long surface of the tube and serve to strip the tube from the mandrel without wrinkling or distorting it. The stripper belts 267 extend radially toward the interior of the wound tube from outer surfaces 269 which engage the wound tube. The upper ends of the stripper belts are trained about drive pulleys 271 which are fastened to respective drive shafts 273 (FIG. 5) extending horizontally from respective right angle gear units 275. The drive pulleys 271 project into slots formed in the upper circular plate 263. At their lower ends, the belts 267 are trained about idler rollers 277 journaled in brackets 279 fixed to the underside of the lower circular plate 265.

To assure that the stripper belts 267 are driven at the web speed, particularly as the speed of the web increases and decreases during start up and shut down operations, the stripper belts are driven from the orbital shaft 239 which turns the mandrel shaft 255 in timed relation to the rotation of the carrier 153. Immediately below the drive sprocket 249 (FIG. 10) for the mandrel shaft 255, there is fastened a sheave 281 which drives a belt 283 which extends to and about an upper sheave 285 which is journaled to revolve about the shaft 255. Referring now to FIGS. 5 and 6, a lower sheave 287 is fastened to the upper sheave 285 and rests on a collar 289 fastened to the shaft 255. The lower sheave 287 drives a belt 291 of double V, cross section which drives the right angle gear units 275 for the stripper belt drive rollers 271. The double section belt 291 is guided and tensioned by being partially trained about an idler sheave 293 (FIG. 8) journaled on an upstanding shaft 295 fastened to the upper circular plate 263. The belt 291 drives pulleys 297 and 299. Each of these pulleys is fastened to a vertical input shaft of a gear unit 275. These gear units each contained a pair of gears (not shown) to provide a right angle change of direction for the drive, and they are fastened by suitable bolts extending through elongated openings in the upper plate 263 so that the outer surface 269 of the stripper belts may be adjusted to give the desired frictional contact with the inner surface of the spirally wound tube. To guide and hold the stripper belts 267 as they move along their outer runs, they are backed by dead plates 301 (FIG. 5) which extend longitudinally between the upper and lower rolls 271 and 277. The dead plates hold the belts 267 in contact with the tube. The dead plates are mounted for inward or outward, i.e., radially directed, adjusting movement by studs 303 (FIG. 5) threaded into brackets 305 welded to the centrally disposed tubular shaft 255 which extends between and is fixed to the upper and lower circular plates 263 and 265.

To support and guide the tube during its transition from a tube to a flattened ribbon, the lower end of the mandrel 148a is flared into a generally wedge or spade-like shape so that the circular cross section of the crepe tissue tube is gradually tapered and flattened as it enters the nip rollers 233 which compress the tube to completely flatten it. In the present instance, the mandrel rods 261 are bent to provide a smooth and gradual transition from the elliptical cross section at the lower plate 265 to a flat or straight line cross section at a pointed end 307 (FIGS. 5 and 6) for the mandrel. Two additional rods 309 (FIG. 5) are disposed beneath the lower ends of the stripper belts 267 and extend downward to the lower pointed end 307. It is preferred that additional guide rods 309 be supported so that their angle of inclination relative to the axis of the mandrel can be adjusted. For this purpose, each of these adjustable guide rods 309 is provided with a pair of spaced radially directed stubs 311 which are inserted through aligned bores in the lower end of the mandrel shaft 255. Suitable lock nuts 313 are threaded on the ends of the studs 311 and are tightened against the shaft 155 to hold the studs and rods 309 at an adjusted position. To adjust the angle of inclination for a rod 309, it is bent relative to its upper stud and then the lock nuts 313 are tightened to hold the guide rod 309 in its new position.

The previously described mandrel 148a functions efficiently at relatively slower speeds to guide the spirally wrapped creped tissue tube toward its flattened condition as it leaves the mandrel and enters the nip rolls 233. While the product obtained with this mandrel is generally satisfactory, it is preferred to provide a more uniform and a more smooth transition in cross section of the tube on the mandrel as it progresses downwardly and assumes the generally flat shape of the flattened ribbon. To this end, the continuously tapering mandrel 148 is preferred in that it eliminates the more abrupt transition at the intersection between upper, right cylindrical mandrel portion and the tapered lower mandrel portion in the above described mandrels 35 and 148a and provides for adjustments of the rods to maintain a relatively constant circumference throughout the length of the mandrel. Consequently, each portion of the web tends to travel through substantially the same distance and at the same velocity as the tube becomes flattened.

Only the very top edge of the mandrel 148 is circular, and as best seen in FIG. 15, the outer surfaces of the guide rods 314 are disposed in a circular arrangement adjacent the upper edge of the circular top plate 263. A bottom support plate 315 fixed to the mandrel support shaft 255 is elliptical in shape, as best seen in FIG. 17, so that the outer surface of the rods 261 disposed about it define an elliptical shape. The major axis of the elliptical plate is disposed over and parallel to the contact line between the nip rollers 233. From the elliptical plate, the rods continue downwardly to and along a straight line which is substantially parallel to the major axis of the elliptical plate. The rods are slightly and continually bowed, i.e., bent arcuately, between their upper ends at the upper plate and their lower ends at the bottom of the mandrel. The outer surfaces of the rods define differing cross sections each with substantially the same circumference, and define longitudinally, a gradually tapering surface for the creped tissue tube to slide down and come together to approach the state of the flat ribbon, which is eventually achieved by passing the tube through the nip rolls 233.

For many uses, it is desirable that the same bias laying apparatus be capable of adjustment to produce bias laid ribbons of different widths. To provide this capability, the mandrel rods 314 are adjustably mounted so that the mandrel circumference may be varied thereby to vary the ultimate width of the flattened ribbon. In the illustrated embodiment of the invention, each of the rods is mounted for movement toward or from the mandrel support shaft 225, resulting in the capability of varying the width of the bias laid ribbon by as much as four inches. As each of the mandrel rods 314 is adjustable individually, it is possible to change the configuration of the mandrel supporting surface slightly, and this has been found helpful in eliminating any localized areas in the tube which might be too taut or too loose. Such adjustments reduce the possibility of wrinkles occurring during the forming and collapsing of the tube. In the preferred embodiment of the inveniton, the mandrel rods 314 are interconnected at their lower ends by a cylindrical rod or pin 322 (FIG. 13). It is preferred to mount each of the mandrel rods 314 adjustably at its upper connection to the circular plate 263 and at its medial connection to the elliptical plate 315. As best seen in FIGS. 15–19, each of the rods is provided with a pair of radially directed pins 317 which extend laterally inward and are projected into a bore of respective sleeves 319 which are fastened to the underside of the top plate and elliptical plate 315 by nuts and bolts 321. A set screw 323 is threaded into a bore in the bottom of each sleeve to engage the laterally directed pin and thereby hold each rod 314 in an adjusted position. At the location of right angle drive units 275 on the top plate 263, the sleeves 319 are fastened to an L-shaped bracket 325 (FIG. 19) secured to a vertically extending side of one of the right angle drive units rather than directly to the plate, as illustrated in FIG. 15. Consequently, these sleeves will not interfere with the positioning of the right angle drive units.

Whereas the mandrel 148a is provided only with two stripper belts, it is preferred to provide the tapered mandrel 148 with four stripper belts arranged in opposing pairs along the major and minor axes of the ellipse. As best seen in FIGS. 14 and 17, one pair of stripper belts 327 is aligned with the major axis of the elliptical plate 315, and they diverge outwardly and downwardly from the top plate 263 at their upper pulleys 271 to their lower pulleys 277. On the other hand, the other pair of belts 329 (FIGS. 13 and 17) converges inwardly from the pulleys 271 located at the top plate to the pulleys 277 fastened to the bottom elliptical plate 315. The pulleys are suitably supported and are mounted on the respective plates for adjustment to bring the outer frictional surfaces of the stripper belts into engagement with the creped tissue tube. The stripper belts are driven by right angle drive units 275 which are driven by a belt 283 (FIG. 14) in the same manner as above described in connection with the mandrel 148a. Dead plates 301 for the respective stripper belts are mounted for radially directed adjusting movements on the ends of bracket arms 303 (FIG. 16) which are fastened to a common hub fixed to the mandrel shaft 255.

The stripper belts 327 terminate immediately beneath the elliptical plate 315, and a pair of guide rods 309 (FIGS. 13 and 14) is adjustably fastened to the lower end of the mandrel shaft 255 to guide the outer edges of the creped tissue tube in the manner described above in connection with the mandrel 148a and the rods 309 shown in FIG. 5.

Returning now to a further description of the preferred apparatus shown in FIG. 4, it includes moisteners 41 as above described in connection with FIG. 1 and the meshed belt carrier 38 mounted on one of the nip rolls 233. The belt textures the creped tissue ribbon and carries it laterally off toward a winder 331. Intermediate the nip rolls 233 and the winder 331 is a pair of rotatable embossing rolls 333 which are rotated in timed relationship to the nip rolls 233, carrier 153 and winder 331 so that the travel speed of the bias laid ribbon is relatively constant as it moves through the nip of the embossing rolls 333. The embossing rolls 333 in this instance form the spaced embossed areas 37 (FIG. 2) each of which is formed by a rectangular grid at approximately 30 glassined individual embossments measuring about 1/32 inch on a side. The embossed areas 37 are spaced in rows and columns separated from each other by about two inches in the illustrated bias laid ribbon 20. The embossing rolls 333 preferably glassine the fibers together at the individual embossments so that the respective plies 21 and 22 are firmly interlocked and welded together at the embossments. Although the embossment areas 37 are optional, it is preferred to provide them as they hold the respective plies 21 and 22 from separating and unwinding under the longitudinally directed pull being exerted on the bias laid ribbon by the winder 331. The embossments 37 may take other forms from that disclosed above.

From the embossing rolls 333, the ribbon 20 is guided about and threaded through a series of rolls 335 leading to a conventional winder 331 which is rotated in a counterclockwise direction, as seen in FIG. 4. The winder may be tangentially driven by the drive unit 140 by use of a driving belt 144 as described above to assure that the reel pulls the ribbon at the proper speed. For larger widths of ribbon a slitter is provided to slit the ribbon longitudinally into several portions prior to being wound by the winder.

A typical operation of the apparatus of FIG. 4 will now be described as an aid to understanding the invention. A large parent roll 29 of a material such as creped tissue is inserted into the rotatable carriage 153 and is mounted for unwinding on a spindle 193. The longitudinal axis 31 for the parent roll is disposed perpendicular to the vertical axis 161 of the mandrel 148 with the roll and carrier both being centered on the vertical axis. The leading end of the web 30 from the parent roll 29 is threaded beneath a guide roller 99 on the carrier and then is moved along the upper surface of the convolute shaped guide 231 to the surface of the mandrel 148 as defined by the radially outer surfaces of the mandrel rods 314. The creped tissue web is now disposed substantially vertically but is directed at an angle to the horizontal, which is termed the helix angle, of the tube to be formed. This angle may be varied, but is usually within the range of 15° to 45° and determines the bias angle for the lines of creping when the spirally formed tube is flattened into the ribbon 20. The edges 23 and 24 of the web may be abutted or slighly overlapped in the preferred embodiment of the invention. The amount of overlap, however, may be varied considerably depending upon the ultimate thickness of web desired. Preferably, the web is wrapped at least one full turn about the mandrel 148 to form a tube, and the lower leading edge of the tube is threaded through the nip rollers 233 and is disposed on the upper side of the mesh belt carrier 38. The nip rollers function to flatten the tube into the ribbon 20, and hard rubber layers on the nip rolls 233 force the plies of creped tissue against the mesh belt and the knuckles and wires of the belt to compress the fibers in the opposed plies together, providing indentations 142a at spaced areas. In the preferred form of the invention, the surface appearance is generally that of a textured surface. Suitable moisteners 41 direct a fine spray on the surface of the nip rolls and belt carrier to moisten the fibers of the bias laid ribbon, thereby reducing the amount of static electrical charge being generated and also condtioning the fibers for the texturing and later embossing.

In the preferred embodiment of the inveniton, the bias laid ribbon is threaded through a pair of embossing rolls 333 which provides spaced embossment areas 37 at which the fibers are highly compressed and welded together to secure the plies together permanently against separation. From the embossing rolls 333, the ribbon extends to the winder 331 at which it is wound into a roll 337.

With the paper web properly threaded through the machine, the integrated drive is operated to begin the rotation of the carrier 153 which operates through an orbital drive shaft 239 to rotate the mandrel 148 in a direction opposite to the rotation of the carrier 153 but at the same angular speed as the carrier. Therefore, the mandrel 148 remains stationary even though the mandrel is supported by the rotating carrier. The orbiting mandrel drive shaft 239 is also utilized to drive the pairs of stripper belts 327 and 329 at the predetermined speed for the ribbon feed. As the diameter of the parent roll 29 becomes smaller, more revolutions of the roll are required to unwind a given number of feet of web. The drive 197 unwinds the parent roll at a constant tangential speed. The belt 33, moisteners 41, embossing rolls 333 and winder 331 are all driven by the drive unit 140, which in turn is driven in synchronism with the carrier 153 so that their speeds are correlated with the speeds of the ribbon moving through the apparatus.

It is within the purview of the present invention to make a bias laid ribbon which has more than two plies as disclosed in detail above. For instance, the angle of inclination of wrap may be disposed more nearly to the horizontal and several revolutions of the carrier may be made for each width of web 30 so that several windings of the web are overlapped, whereby the resultant number of plies may be increased to four plies or even to in excess of four plies. More specifically, the web 30 may be wrapped about the mandrel to form a helix with a pitch of slightly less than 50%. In this manner, each wrap of the web overlies its preceding wrap by slightly more than one-half of the web width. Thus, the creped tissue tube being formed is substantially double walled except for a triple ply seam formed by overlapping edges of alternate wraps disposed on opposite sides of an intermediate wrap. When the double walled tube is pulled downwardly and flattened by the nip rolls 36, a substantially four ply, bias laid ribbon of creped tissue is formed. A specific example of such a ribbon has been formed from a web of creped tissue which has a 9 pound dry basis weight for a ream of 2,880 ft.$^2$ and a 10.7 pound finish basis weight for a ream of 2,880 ft.$^2$. The web is a high wet strength, creped tissue having about 21% stretch and about three times the strength in a direction extending longitudinally as transversely of the web. The web was wrapped at an angle of about 15° to the horizontal and the linear velocity of the tube moving down the mandrel was such that each succeeding wrap of web overlaid the preceding wrap by slightly more than one-half of the width of the web in the longitudinal direction. When the tube was collapsed and embossed, the resulting ribbon had its inner plies adhered together with the respective lines of strength oppositely directed and at an angle of about 15° to the transverse dimension of the ribbon. Each of the two outer plies is adhered to its adjacent inner ply with its line of strength aligned with the line of strength of its inner ply.

It is also contemplated to make a four or more ply, bias laid ribbon 38 by adding another parent roll of creped tissue to the carrier 43 and by simultaneously stripping the two webs from the carrier and wrapping the two webs simultaneously about the mandrel to form a double walled, helically wound tube on the mandrel. Alternatively, an additional and separate carrier for an additional second parent roll of creped tissue could be disposed above the illustrated carrier 43 to rotate about the axis of the mandrel and wrap its web in a helix on the mandrel and then the illustrated web could be wrapped helically about the tube formed from the other webs. Additional strength may be provided by the inclusion of scrim or threads unwound from reels and sandwiched between the ribbon plies with the apparatus above disclosed. Also, it will be apparent that the present invention is not limited to the use of creped paper, as other materials may be used with the apparatus and method of the present invention to provide a bias laid product.

From the foregoing, it will be seen that inertia and gyroscopic forces are reduced by disposing the parent roll 29 on the longitudinal axis of the mandrel. This is particularly important for apparatus having relatively large masses and high speed rotational movements. The rate of web feed is maintained relatively constant irrespective of the decreasing diameter of the parent roll as it unwinds, and the mandrel is shaped to provide a uniform velocity and travel distance for the tube on the mandrel. The respective stripping belts, nip rolls and carriers and unwinders are driven at speeds correlated with the unwinding speed so that the web is formed with a minimum of wrinkles or tears. Frictional forces and static electricity are reduced with a cage mandrel and moisteners for wetting the fibers. A larger surface area, better hand and improved absorptivity are provided by texturing the web with a meshed belt disposed between the nip of a pair of rolls which compress the fibers together in a pattern corresponding to the mesh of the belt. The belt carrier provides a dual function in that it not only textures the ribbon but also serves as a carrier for moving the web off laterally to a winder.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A method of forming a bias laid ribbon from at least one elongated web comprising the steps of unwinding the web from a supply roll mounted on a rotatable carrier, rotating the carrier and carrying the roll in a path about a vertically-extending mandrel at a predetermined speed, feeding the web forwardly from the roll and spirally wrapping the web about a mandrel to form a hollow tube, rotating the mandrel about a vertical axis in a direction counter to the carrier's direction of rotation and at a speed equal to said predetermined speed of carrier rotation, stripping the formed tube from the mandrel, flattening the hollow tube into an elongated multi-ply ribbon with opposite plies disposed at a bias to one another and to the direction of said ribbon, and joining opposite plies of the multi-ply ribbon at spaced locations to interlock the plies of the ribbon.

2. A method in accordance with claim 1 in which the step of joining the plies comprises embossing the webs at spaced areas located both longitudinally and transversely of the bias laid ribbon.

3. A method in accordance with claim 1 including the further step of: traveling a carrier belt into a nip to engage the tube at the time of flattening and for carrying the flattened bias laid ribbon therefrom on said belt.

4. A method of forming a bias laid ribbon from at least one elongated web comprising the steps of unwinding the web from a supply roll on a rotatable carrier, rotating the carrier and carrying the roll in a path about a vertically-extending mandrel at a predetermined speed, feeding the web forwardly and downwardly from the roll and spirally wrapping the web about the mandrel to form a hollow tube, stripping the formed tube downwardly from the mandrel, flattening the hollow tube in a nip of a pair of rollers into an elongated multi-ply ribbon with opposite plies disposed at a bias to one another and to the direction of said ribbon, traveling a belt into said nip to engage the tube at the time of flattening and carrying the flattened bias laid ribbon from said nip on said belt, and joining the opposite plies of the bias laid ribbon together at spaced areas.

References Cited
UNITED STATES PATENTS

| | | | |
|---|---|---|---|
| 3,488,242 | 1/1970 | Berry | 156—195 X |
| 1,504,255 | 8/1924 | McDonald | 156—195 X |
| 3,383,261 | 5/1968 | Arnold | 156—428 X |
| 3,300,368 | 1/1967 | Copper et al. | 156—183 X |

ALFRED L. LEAVITT, Primary Examiner

D. A. SIMMONS, Assistant Examiner

U.S. Cl. X.R.

156—184, 194, 198, 219